United States Patent
Matsumoto et al.

(10) Patent No.: US 10,871,267 B2
(45) Date of Patent: Dec. 22, 2020

(54) LAMP BODY STRUCTURE FOR SADDLE RIDING VEHICLE

(71) Applicant: HONDA MOTOR CO., LTD., Tokyo (JP)

(72) Inventors: Takahiro Matsumoto, Wako (JP); Tomohiro Kudo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/544,153

(22) Filed: Aug. 19, 2019

(65) Prior Publication Data
US 2020/0096168 A1   Mar. 26, 2020

(30) Foreign Application Priority Data
Sep. 21, 2018 (JP) ................. 2018-177941

(51) Int. Cl.
  *F21S 43/27* (2018.01)
  *F21S 43/239* (2018.01)
  *B62J 6/04* (2020.01)
  *F21W 107/13* (2018.01)

(52) U.S. Cl.
  CPC .......... *F21S 43/27* (2018.01); *B62J 6/04* (2013.01); *F21S 43/239* (2018.01); *F21W 2107/13* (2018.01)

(58) Field of Classification Search
  CPC ............ B62J 6/04; F21S 43/239; F21S 43/27; F21W 2107/13
  See application file for complete search history.

(56) References Cited

U.S. PATENT DOCUMENTS

| | | | | |
|---|---|---|---|---|
| 6,158,279 A * | 12/2000 | Saiki | .......................... | B62J 6/05 73/493 |
| 7,401,953 B2 * | 7/2008 | Isayama | ................... | B62J 17/02 362/474 |
| 7,815,353 B2 * | 10/2010 | Aoki | .......................... | B62J 6/02 362/303 |
| 8,568,004 B2 | 10/2013 | Nishijima et al. | | |

(Continued)

FOREIGN PATENT DOCUMENTS

CN 103707963 4/2014
JP H04-2147 1/1992

(Continued)

OTHER PUBLICATIONS

German Office action dated May 20, 2020, English abstract included, 20 pages.

(Continued)

*Primary Examiner* — Tsion Tumebo
(74) *Attorney, Agent, or Firm* — Rankin, Hill & Clark LLP

(57) ABSTRACT

The lamp body structure for the saddle riding vehicle includes a taillight, and a cover covering the taillight from the periphery. The cover includes a pair of rear-side turn signal lamps fixed to the cover such as to be located on both left and right sides of the taillight. The rear-side turn signal lamp is provided with a fixture for fixing the rear-side turn signal lamp to the cover. The taillight is inserted into an opening provided in the cover, whereby a lens is exposed to outside and is covered by the cover from the periphery. The rear-side turn signal lamp includes a guard section covering the fixture.

10 Claims, 12 Drawing Sheets

(56) References Cited

U.S. PATENT DOCUMENTS

| | | | | |
|---|---|---|---|---|
| 2004/0079009 | A1* | 4/2004 | Arrua | B62J 99/00 40/204 |
| 2004/0145897 | A1* | 7/2004 | Felty | B62J 6/02 362/473 |
| 2005/0083703 | A1* | 4/2005 | Nakayama | B62J 11/19 362/473 |
| 2006/0181891 | A1* | 8/2006 | Surawichai | B60Q 1/0041 362/474 |
| 2007/0025114 | A1* | 2/2007 | Isayama | B60Q 1/0041 362/474 |
| 2008/0205073 | A1* | 8/2008 | Suita | B60Q 1/2607 362/473 |
| 2009/0206628 | A1* | 8/2009 | Misaki | B62J 27/00 296/78.1 |
| 2014/0016336 | A1* | 1/2014 | Takenaka | B60Q 1/0088 362/473 |
| 2015/0129342 | A1* | 5/2015 | O'Rourke | B60K 13/02 180/219 |
| 2016/0318568 | A1* | 11/2016 | Hosoda | F21S 43/14 |

FOREIGN PATENT DOCUMENTS

| | | |
|---|---|---|
| JP | 2011-006028 | 1/2011 |
| JP | 2012-62014 A | 3/2012 |
| JP | 2014-69688 A | 4/2014 |

OTHER PUBLICATIONS

Japanese Office Action with English translation dated May 12, 2020, 9 pages.

Chinese Office Action dated Sep. 30, 2020, English translation included, 16 pages.

* cited by examiner

LAMP BODY STRUCTURE FOR SADDLE RIDING VEHICLE

INCORPORATION BY REFERENCE

The present application claims priority under 35 U.S.C. § 119 to Japanese Patent Application No. 2018-177941 filed on Sep. 21, 2018. The content of the application is incorporated herein by reference in its entirety.

TECHNICAL FIELD

The present invention relates to a lamp body structure for a saddle riding vehicle.

BACKGROUND ART

Hitherto, in a saddle riding vehicle, there has been known a structure in which harnesses of winkers as lamp bodies are protected by covering them from below by a projection-shaped wall provided in a fender (see, for example, Patent Document 1).

In addition, in an electrical unit provided on a saddle riding vehicle, there has been known a structure in which a harness of the electrical unit is protected by a guard section provided in the electrical unit itself (see, for example, Patent Document 2).

PRIOR ART DOCUMENT

Patent Documents

[Patent Document 1]
Japanese Utility Model Publication No. Hei 4-2147
[Patent Document 2]
Japanese Patent Laid-open No. 2011-6028

SUMMARY OF THE INVENTION

Problem to be Solved by the Invention

Incidentally, in a lamp body structure including a lamp body and a cover that covers the lamp body, design property can be enhanced by covering the lamp body from the periphery with the cover. At the time of assembling, however, members provided on the cover and the lamp body are liable to make contact with each other. Therefore, damaging of the lamp body should be prevented by, for example, a masking treatment, so that assembling is laborious to perform. The structures disclosed in Patent Documents 1 and 2 are not for protecting electric equipment such as a lamp body at the time of assemblage.

The present invention has been made in consideration of the above-mentioned circumstances. Accordingly, it is an object of the present invention to make it possible to enhance design property by covering a lamp body with a cover and to enhance assemblability, in a lamp body structure for a saddle riding vehicle.

Means for Solving the Problem

According to an aspect of the present invention, there is provided a lamp body structure for a saddle riding vehicle, including a lamp body (51), and a cover (52) covering the lamp body (51) from a periphery, in which the cover (52) includes a pair of turn signal lamps (53) fixed to the cover (52) such as to be located on both left and right sides of the lamp body (51), the turn signal lamp (53) being provided with a fixture (84) for fixing the turn signal lamp (53) to the cover (52), the lamp body (51) is inserted in an opening (77) formed in the cover (52), whereby a luminous section (65) is exposed to outside and is covered by the cover (52) from a periphery, and the turn signal lamp (53) includes a guard section (93) covering the fixture (84).

In addition, in the aforementioned configuration, the turn signal lamp (53) may include a main body section (81) that emits light, and a rubber section (82) that elastically supports the main body section (81) on the cover (52), and the guard section (93) may be provided in the rubber section (82).

Besides, in the aforementioned configuration, the rubber section (82) may include an engaging section (82a) for engagement with the cover (52), the turn signal lamp (53) may include a core member (83) disposed inside the rubber section (82) at the engaging section (82a), and the fixture (84) may fix the rubber section (82) and the core member (83).

Further, in the aforementioned configuration, the fixture (84) may be any one of a screw, a clip, and a fixing body formed to be integral with the core member (83).

In addition, in the aforementioned configuration, the rubber section (82) may include an inside extension section (94) extending more toward the lamp body (51) side than the guard section (93).

Besides, in the aforementioned configuration, an end portion (94a) of the inside extension section (94) may be located substantially on an extension line (97) of a side surface (65c) of the lamp body (51).

In addition, in the aforementioned configuration, a fender (36) that covers a wheel (3) and a reflector (55) that reflects light may be provided, and the cover (52) may be smaller than the fender (36) in transverse directional size, and the luminous section (65) of the lamp body (51) may be greater than the reflector (55) in transverse directional size.

Besides, in the aforementioned configuration, the guard section (93) may have a plate-like shape connected to the rubber section (82) through a hinge section (93a) at one end, and may be openable and closable with the hinge section (93a) as a center by elasticity of the rubber section (82).

In addition, in the aforementioned configuration, the rubber section (82) may include an inside extension section (94) extending more toward the lamp body (51) side than the guard section (93), the core member (83) may include projections (87a, 87b) projecting in a radial direction, the rubber section (82) may be tubular, and may include a hole section (90) for engagement with the projection (87a, 87b) of the core member (83) inserted into inside of the rubber section (82), and the inside extension section (94) may extend to the lamp body (51) side from a part where the hole section (90) is provided.

Further, in the aforementioned configuration, the lamp body (51) may be inserted into the opening (77) of a sub-assembly (95) formed by assembling the turn signal lamps (53) onto the cover (52).

In addition, in the aforementioned configuration, the lamp body (51) may be a taillight, and the turn signal lamps (53) may be provided at rear portions of the vehicle.

Effects of the Invention

The lamp body structure for the saddle riding vehicle includes the lamp body, and the cover covering the lamp body from the periphery, in which the cover includes the pair of turn signal lamps fixed to the cover such as to be located on both left and right sides of the lamp body, the turn signal lamp being provided with the fixture for fixing the turn signal lamp to the cover, the lamp body is inserted in the opening formed in the cover, whereby the luminous section is exposed to outside and is covered by the cover from the periphery, and the turn signal lamp includes the guard section covering the fixture.

According to this configuration, the fixtures for fixing the turn signal lamps to the cover are covered by the guard sections provided in the turn signal lamps, and it is therefore ensured that, when the lamp body is inserted into the opening of the cover covering the lamp body from the periphery, the fixtures can be prevented by the guard sections from making contact with the lamp body. Therefore, design property can be enhanced by covering the lamp body with the cover, and assemblability can be enhanced.

In addition, in the aforementioned configuration, the turn signal lamp may include the main body section that emits light, and the rubber section that elastically supports the main body section on the cover, and the guard section may be provided in the rubber section.

According to this configuration, since the guard section is provided as part of the rubber section, the guard section makes soft contact when making contact with the turn signal lamp. Therefore, damaging of the lamp body can be effectively prevented.

Besides, in the aforementioned configuration, the rubber section may include the engaging section for engagement with the cover, the turn signal lamp may include the core member disposed inside the rubber section at the engaging section, and the fixture may fix the rubber section and the core member.

According to this configuration, since the core member is provided inside the engaging section where the rubber section is engaged with the cover, the rubber section can be firmly fixed to the cover, while securing a configuration in which the turn signal lamp is elastically supported by the rubber section. In addition, the fixture for fixing the rubber section and the core member is covered by the guard section, whereby damaging of the lamp body can be prevented.

Further, in the aforementioned configuration, the fixture may be any one of a screw, a clip, and a fixing body formed to be integral with the core member.

According to this configuration, the screw, the clip and the fixing body formed to be integral with the core member are hard and, hence, they are liable to damage the lamp body, but the lamp body is covered by the guard section. Therefore, damaging of the lamp body is effectively prevented.

In addition, in the aforementioned configuration, the rubber section may include the inside extension section extending more toward the lamp body side than the guard section.

According to this configuration, since the inside extension section is liable to come into contact with the lamp body earlier than the guard section, the guard section is restrained from strongly coming into contact with the lamp body. Therefore, damaging of the lamp body is effectively prevented.

Besides, in the aforementioned configuration, one end portion of the inside extension section may be located substantially on the extension line of a side surface of the lamp body.

According to this configuration, when the lamp body is inserted into the opening of the cover, the insertion of the lamp body can be guided by the end portion of the inside extension section. Therefore, the lamp body can be easily assembled onto the cover.

In addition, in the aforementioned configuration, the fender that covers the wheel and the reflector that reflects light may be provided, and the cover may be smaller than the fender in transverse directional size, and the luminous section of the lamp body may be greater than the reflector in transverse directional size.

According to this configuration, in the case where the cover is smaller than the fender in transverse directional size and the luminous section of the lamp body is greater than the reflector in transverse directional size, the clearance between the lamp body and the fixture is reduced and, hence, the lamp body is liable to be damaged, but damaging of the lamp body can be effectively prevented by the guard section.

Besides, in the aforementioned configuration, the guard section may have a plate-like shape connected to the rubber section through the hinge section at one end, and may be openable and closable with the hinge section as a center by elasticity of the rubber section.

According to this configuration, by opening and closing the guard section with the hinge section as a center by elasticity of the rubber section, easy access to the fixture is secured, and assemblability is good.

In addition, in the aforementioned configuration, the rubber section may include the inside extension section extending more toward the lamp body side than the guard section, the core member may include projections projecting in the radial direction, the rubber section may be tubular, and may include the hole section for engagement with the projection of the core member inserted into inside of the rubber section, and the inside extension section may extend to the lamp body side from the part where the hole section is provided.

According to this configuration, the core member can be inserted into the inside of the rubber section in the manner of pushing open the rubber section through the inside extension section, so that assemblability is good.

Further, in the aforementioned configuration, the lamp body may be inserted into the opening of the sub-assembly formed by assembling the turn signal lamps onto the cover.

According to this configuration, since the lamp body can be assembled onto the sub-assembly formed by assembling the turn signal lamps onto the cover, the assembling steps can be simplified.

In addition, in the aforementioned configuration, the lamp body may be the taillight, and the turn signal lamps may be provided at rear portions of the vehicle.

According to this configuration, design property of the taillight can be enhanced by covering the taillight with the cover. Besides, when the taillight is inserted into the cover, the taillight can be prevented from being damaged by the fixtures of the turn signal lamps at the rear portions of the vehicle.

MODE FOR CARRYING OUT THE INVENTION

Figure 1:
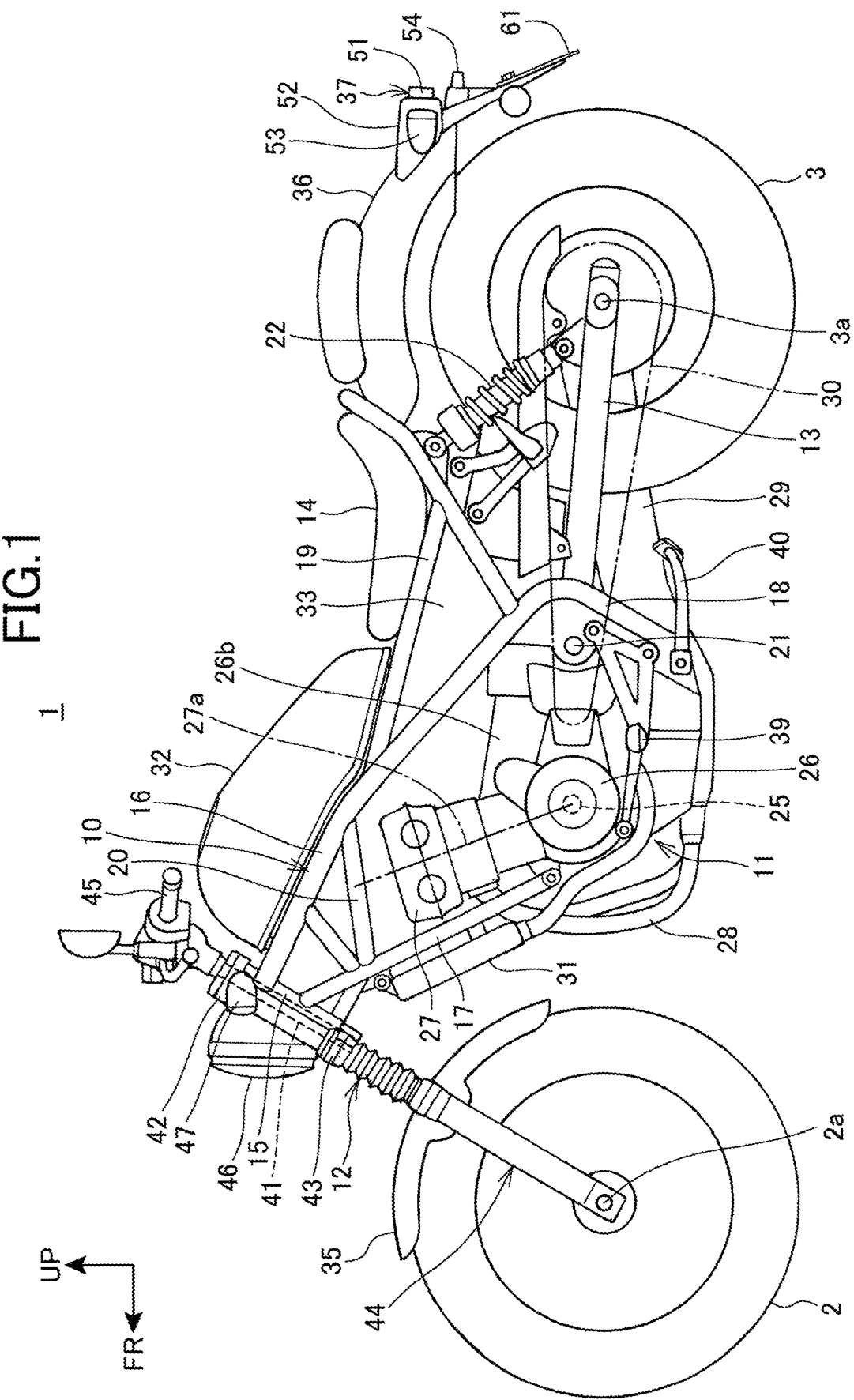
FIG. 1 is a left side view of a motorcycle according to an embodiment of the present invention.

An embodiment of the present invention will be described below, referring to the drawings. Note that in the following description, the directions such as the forward, rearward, leftward, rightward, upward and downward directions are the same as those with reference to the vehicle body, unless otherwise specified. In addition, in each drawing, symbol FR indicates the front side of the vehicle body, symbol UP indicates the upper side of the vehicle body, and symbol LH indicates the left-hand side of the vehicle body.

Figure 2:
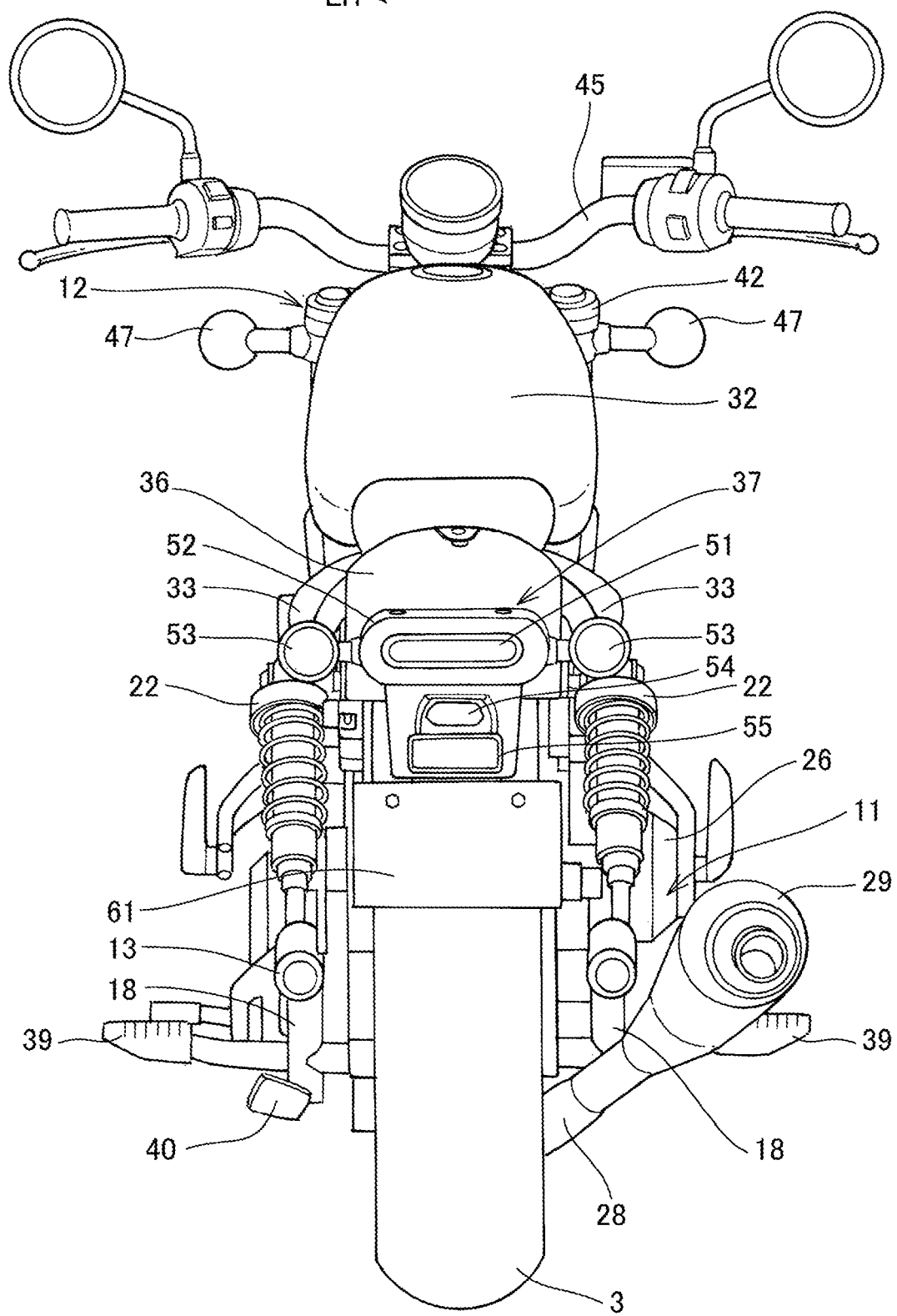
FIG. 2 is a view of the motorcycle, as viewed from a rear side.

FIG. 1 is a left side view of a motorcycle 1 according to an embodiment of the present invention. FIG. 2 is a view of the motorcycle 1, as viewed from a rear side.

The motorcycle 1 is a vehicle in which an engine 11 as a power unit is supported by a body frame 10, a front fork 12 by which a front wheel 2 is steerably supported on a front end of the body frame 10, and a swing arm 13 supporting a rear wheel 3 (wheel) is provided on a rear portion side of the body frame 10.

The motorcycle 1 is a saddle riding vehicle on which a rider is seated astride a seat 14, and the seat 14 is provided on an upper side of a rear portion of the body frame 10.

The body frame 10 includes a head pipe 15 provided at a front end of the body frame 10, a pair of left and right main frames 16 extending rearwardly downward from the head pipe 15, a down frame 17 extending rearwardly downward from a lower side of the main frame 16 in the head pipe 15, a pair of left and right pivot frames 18 extending downward from rear ends of the main frames 16, and seat frames 19 extending rearward from rear portions of the main frames 16 and upper portions of the pivot frames 18.

In addition, the body frame 10 includes a plurality of reinforcement frames 20 that connect upper portions of the down frame 17 and upper portions of the main frames 16.

The swing arm 13 is supported by a pivot shaft 21 which is supported by the left and right pivot frames 18. The pivot shaft 21 extends horizontally in the transverse direction (vehicle width direction). The swing arm 13 has its front end portion supported by the pivot shaft 21, and is swung upward and downward with the pivot shaft 21 as a center.

The rear wheel 3 is shaft-supported by an axle 3a provided at a rear end portion of the swing arm 13.

The motorcycle 1 includes a pair of left and right rear suspensions 22 arranged between a rear end portion of the swing arm 13 and the seat frames 19.

The engine 11 is disposed between the down frame 17 and the pivot frames 18 on a lower side of the main frames 16, and is fixed to the body frame 10.

The engine 11 includes a crankcase 26 that supports a crankshaft 25 extending horizontally in the transverse direction (left-right direction), and a cylinder section 27 extending upward from a front portion of the crankcase 26. A cylinder axis 27a of the cylinder section 27 is inclined forward relative to the vertical.

An intake system (not illustrated) of the engine 11 is connected to an intake port at a rear surface of the cylinder section 27.

An exhaust pipe 28 of the engine 11 extends downward from an exhaust port at a front surface of the cylinder section 27, and extends rearward by passing on a lower side of the engine 11. A muffler 29 disposed on a lateral side of the rear wheel 3 is connected to a rear end of the exhaust pipe 28.

A rear portion of the crankcase 26 is a transmission case section 26b in which a transmission is accommodated. An output of the engine is transmitted to the rear wheel 3 by a drive chain 30 that connects an output shaft of the transmission and the rear wheel 3.

A radiator 31 of the engine 11 is supported by the down frame 17.

A fuel tank 32 is disposed between the head pipe 15 and the seat 14 on an upper side of the main frames 16.

Parts between the seat frames 19 and the main frames 16 are covered by side covers 33.

A front fender 35 covering the front wheel 2 from above is supported by the front fork 12.

The rear wheel 3 is covered from above by a rear fender 36 (fender) disposed on a rear side of the seat 14.

A rear lighting unit 37 is mounted to a rear end portion of the rear fender 36.

A pair of left and right steps 39 on which to place the feet of the rider seated on the seat 14 are disposed on a front side of the pivot frames 18.

A side stand 40 that grounds to support the vehicle body when the motorcycle 1 is parked is supported by a lower end portion of the pivot frame 18 on the left side.

The front fork 12 includes a steering shaft 41 rotatably shaft-supported by the head pipe 15, a top bridge 42 fixed to an upper end of the steering shaft 41, a bottom bridge 43 fixed to a lower end of the steering shaft 41, a pair of left and right fork tubes 44 supported by the top bridge 42 and the bottom bridge 43, and a steering handlebar 45 fixed to the top bridge 42.

The front wheel 2 is shaft-supported by an axle 2a provided at lower end portions of the fork tubes 44.

A headlight 46 is disposed on a front side of the head pipe 15, and is supported by the front fork 12.

A pair of left and right front-side turn signal lamps 47 are attached respectively to upper end portions of the left and right fork tubes 44.

Figure 3:
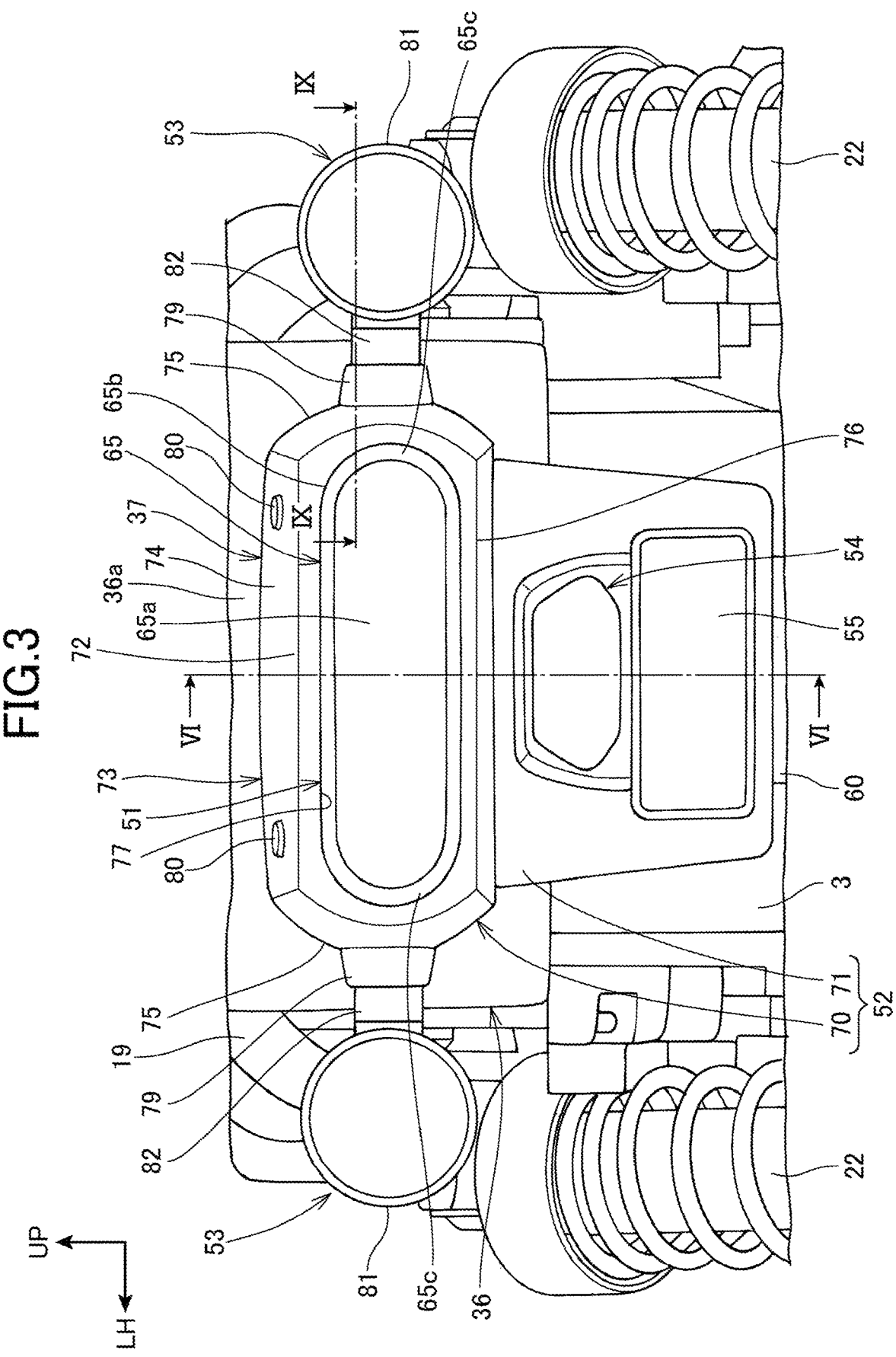
FIG. 3 is a view of a peripheral part around a rear lighting unit, as viewed from a rear side.
Figure 4:
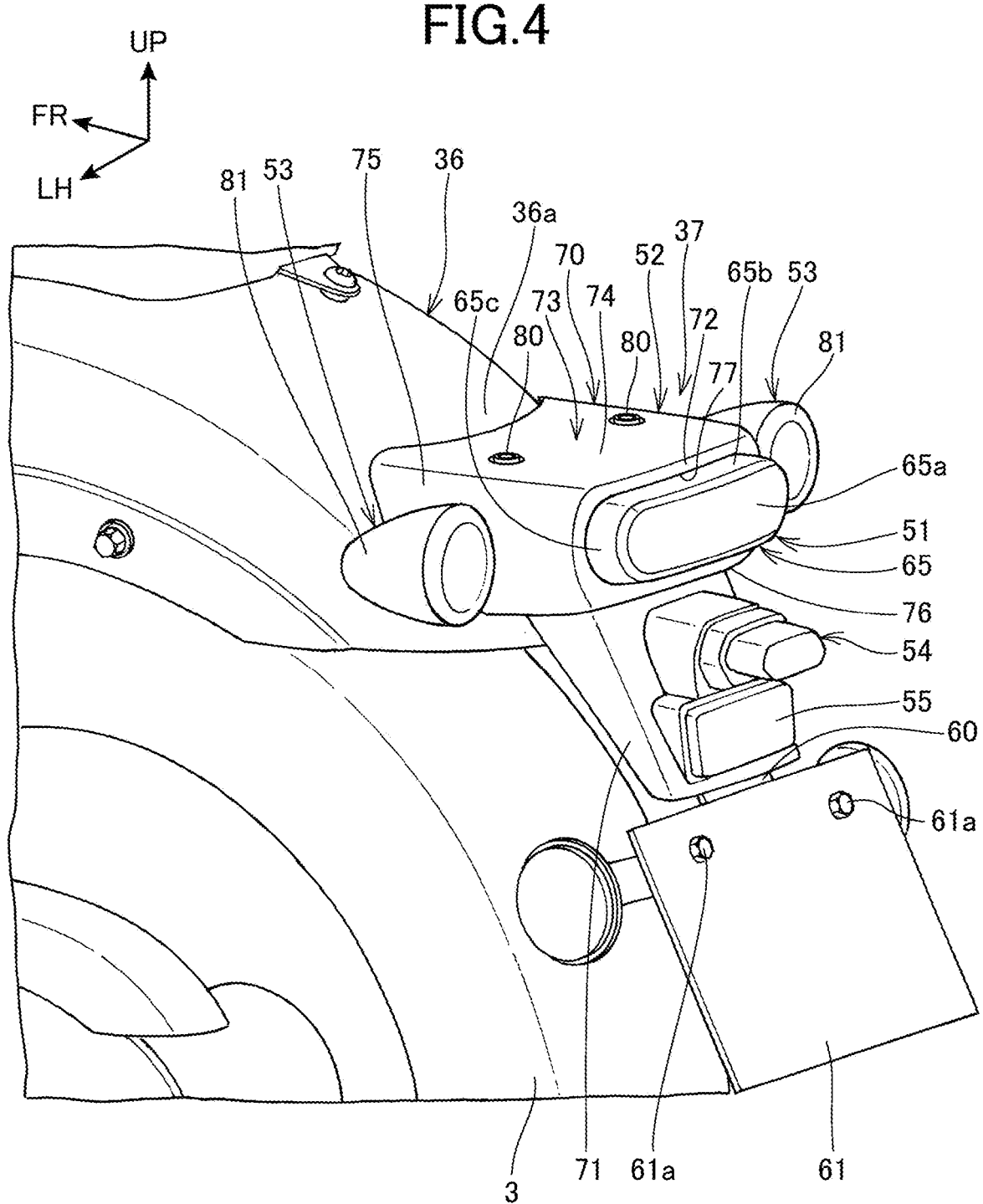
FIG. 4 is a perspective view of a rear end portion of the motorcycle, as viewed from a rear lateral side.
Figure 5:
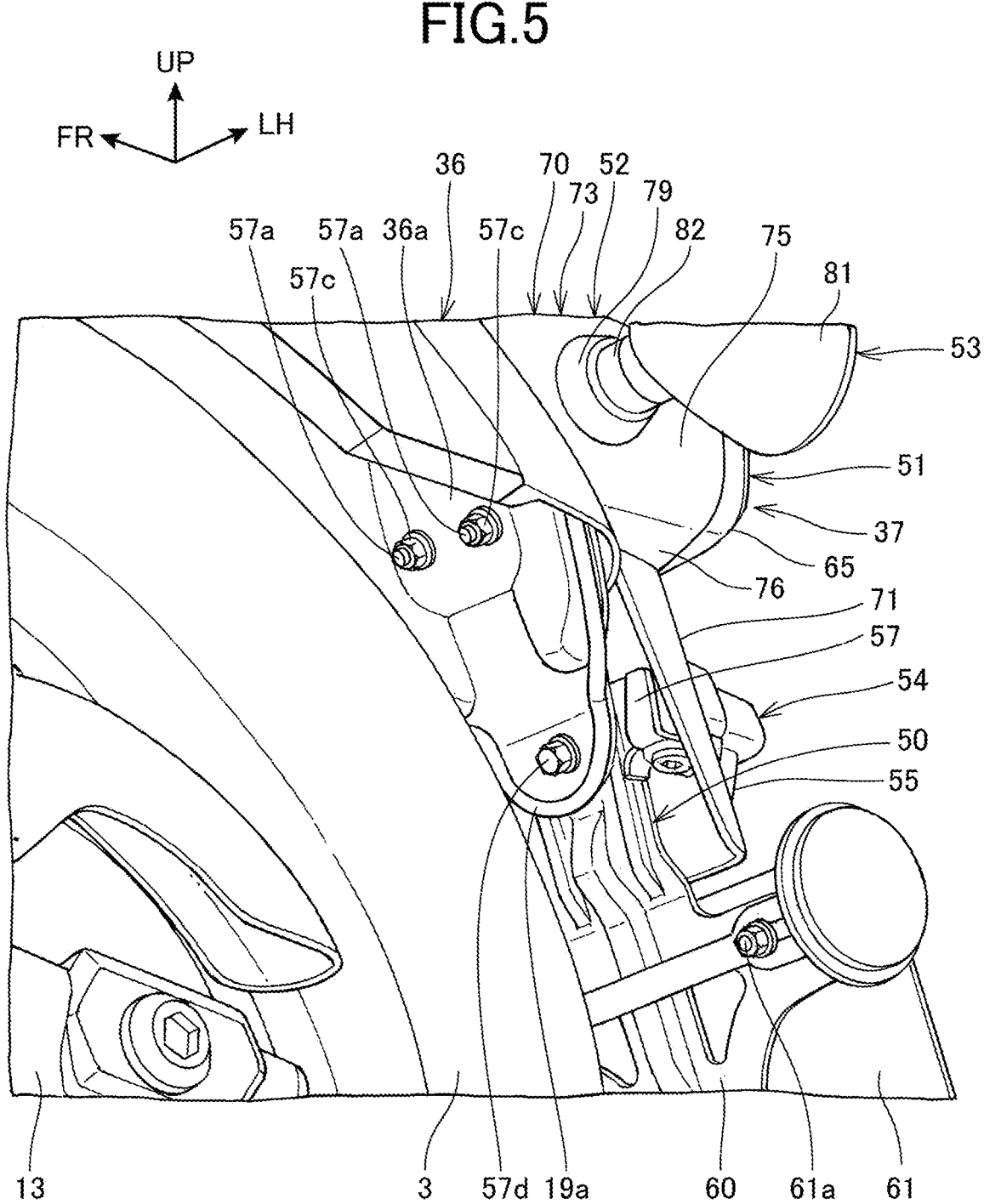
FIG. 5 is a perspective view of a rear fender and the rear lighting unit, as viewed from a back side.
Figure 6:
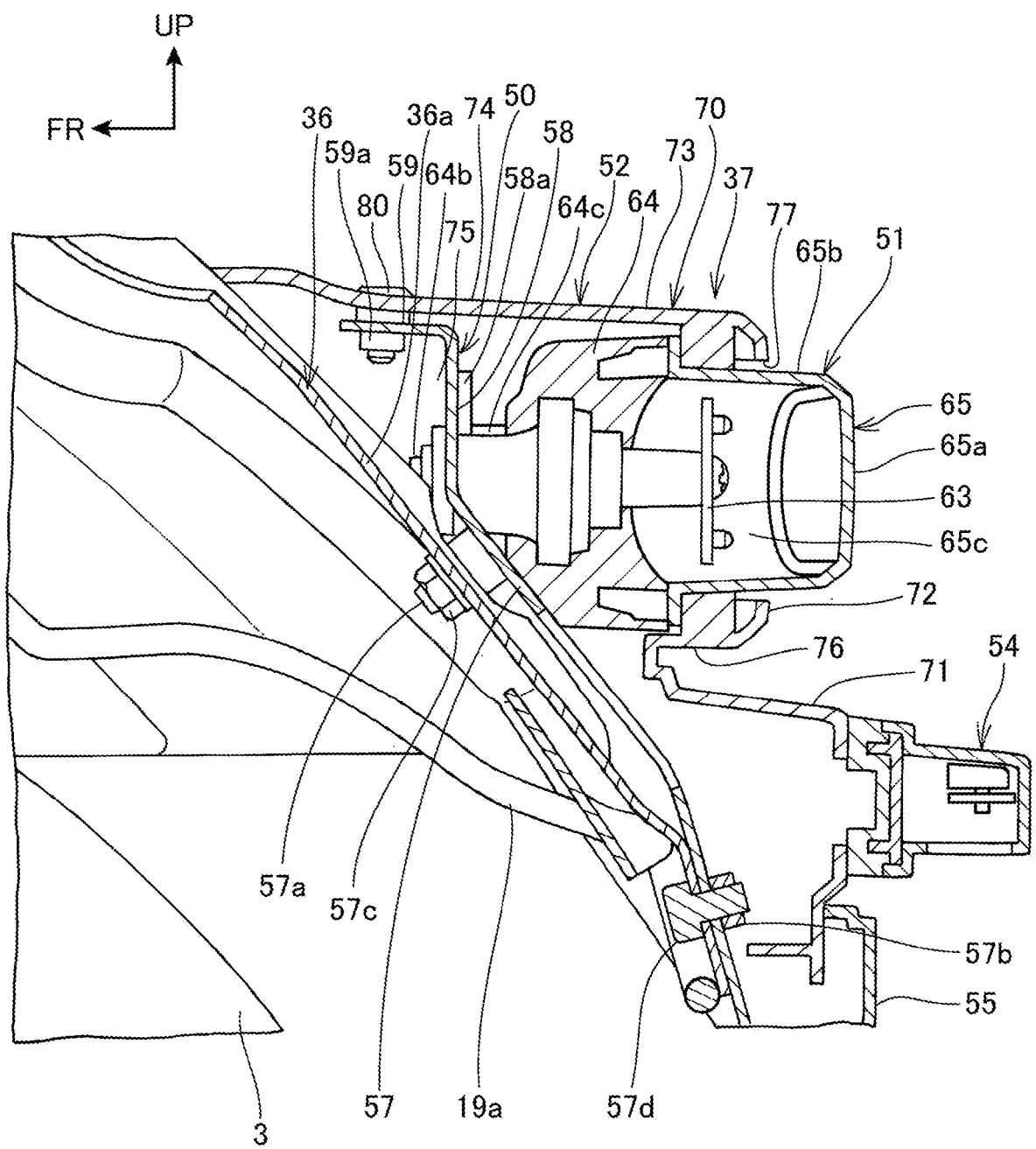
FIG. 6 is a sectional view taken along line VI-VI of FIG. 3.

FIG. 3 is a view of a peripheral part around the rear lighting unit 37, as viewed from a rear side. FIG. 4 is a perspective view of a rear end portion of the motorcycle 1, as viewed from a rear lateral side. FIG. 5 is a perspective view of the rear fender 36 and the rear lighting unit 37, as viewed from the back side. FIG. 6 is a sectional view taken along line VI-VI of FIG. 3.

Referring to FIGS. 3 to 6, the rear lighting unit 37 includes a lighting device stay 50 attached to the rear fender 36, a taillight 51 (lamp body) that emits light rearward, a cover 52 that covers the taillight 51 from the periphery, a pair of left and right rear-side turn signal lamps 53, a license light 54, and a reflector 55 that reflects light rearward.

The rear lighting unit 37 is disposed in the transverse directional center similarly to the rear wheel 3.

The rear fender 36 is curved along an outer shape of an upper portion of the rear wheel 3 in side view of the vehicle, and a slant surface 36a inclined rearwardly downward is formed at a rear portion of the rear fender 36. The rear lighting unit 37 is attached to an upper surface of the slant surface 36a.

The rear fender 36 is supported from below by rear frames 19a extending rearward from the seat frames 19.

Figure 7:
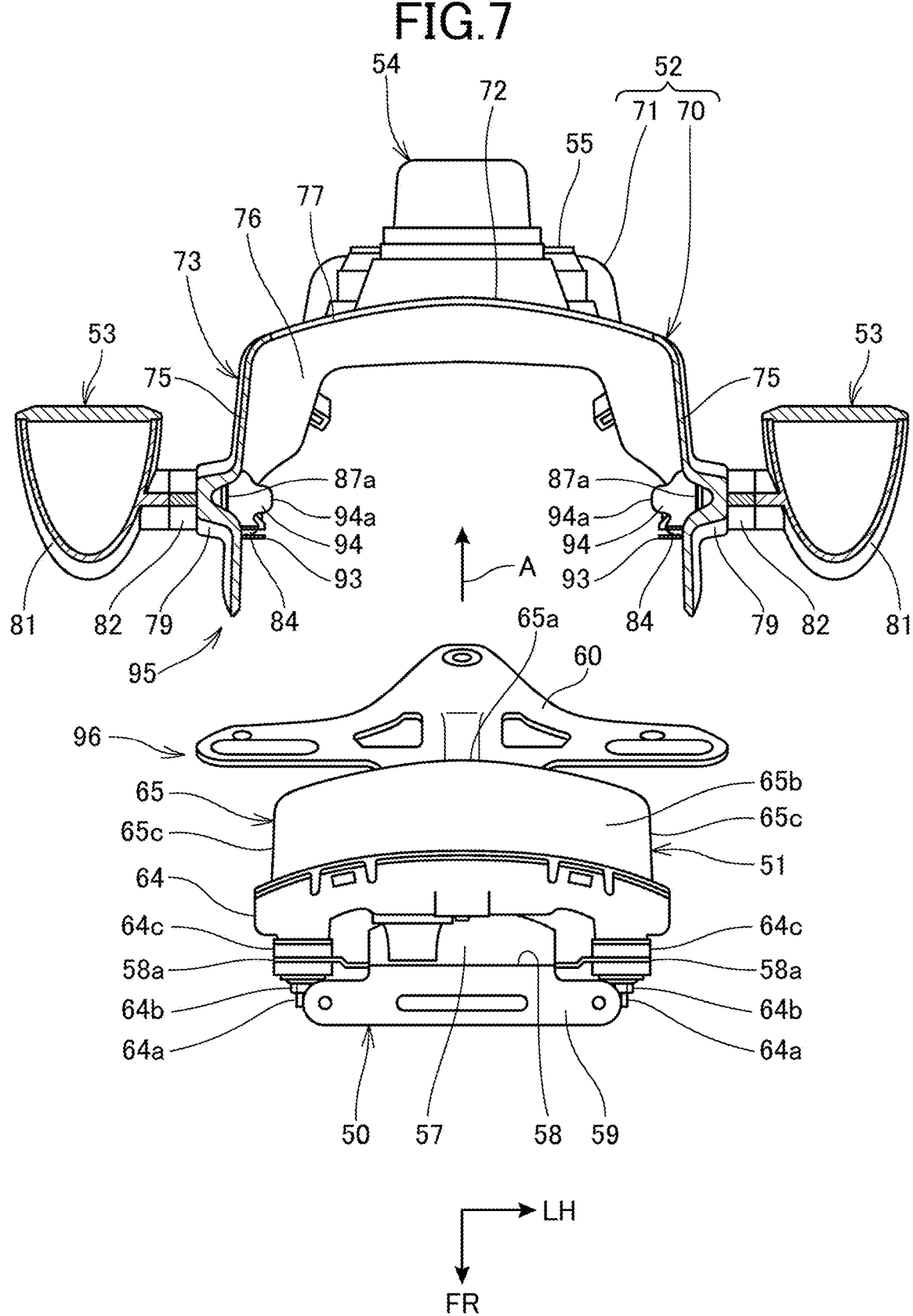
FIG. 7 is a top plan view for explaining assemblage of the rear lighting unit.
Figure 8:
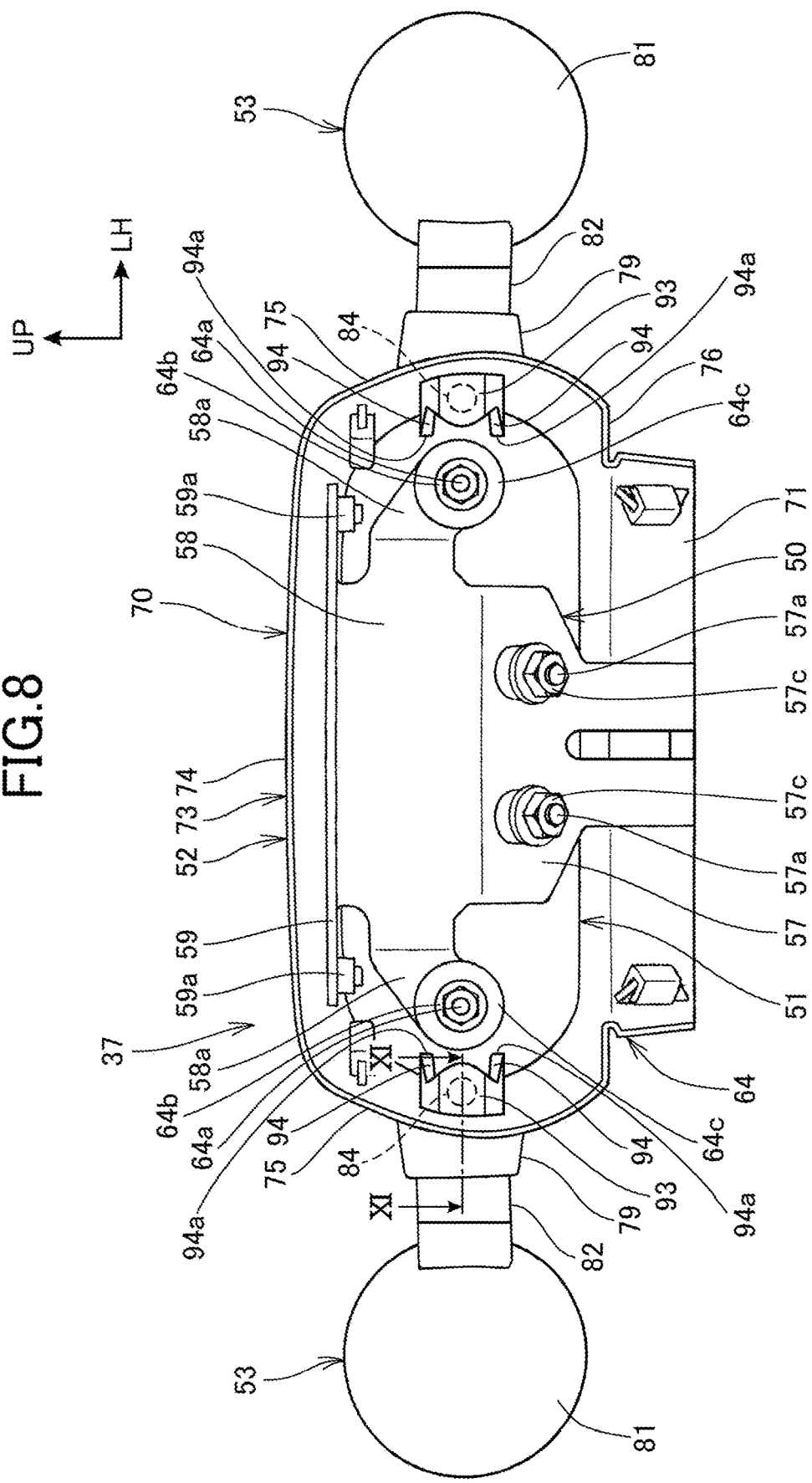
FIG. 8 is a view of the rear lighting unit, as viewed from a front side.

FIG. 7 is a top plan view for explaining assemblage of the rear lighting unit 37. In FIG. 7, the cover 52 and the rear-side turn signal lamps 53 are depicted in section. FIG. 8 is a view of the rear lighting unit 37, as viewed from a front side.

Referring to FIGS. 5 to 8, the lighting device stay 50 is in the form of a plate extending vertically such as to lie along the upper surface of the slant surface 36a of the rear fender 36.

The lighting device stay 50 includes a fender attachment section 57 extending rearwardly downward along the upper surface of the slant surface 36a, a taillight fixing section 58 bent at an upper end of the fender attachment section 57 and extending upward substantially vertically, a cover fixing section 59 bent at an upper end of the taillight fixing section 58 and extending forward substantially horizontally, and a license plate fixing section 60 extending rearwardly downward from a lower end of the fender attachment section 57.

A pair of left and right bolt sections 57a erected to a front lower side are provided at an upper portion of the fender attachment section 57 of the lighting device stay 50.

A nut portion 57b is provided at a rear surface of a lower portion of the fender attachment section 57. The nut portion 57b is located in the transverse directional center.

The fender attachment section 57 is fixed to the rear fender 36 by nuts 57c fastened to the bolt sections 57a penetrating to the inside of the rear fender 36.

In addition, the fender attachment section 57 is fixed to the rear fender 36 by a bolt 57d penetrating the rear fender 36 from the back side of the rear fender 36 and fastened to the nut portion 57b.

The taillight fixing section 58 of the lighting device stay 50 includes a pair of left and right arm sections 58a extending more toward the transverse directionally outer side than the fender attachment section 57. The taillight 51 is fixed to the arm sections 58a.

A pair of nut portions 59a are provided at lower surfaces of both transverse directional end portions of the cover fixing section 59 of the lighting device stay 50.

The license plate fixing section 60 of the lighting device stay 50 extends more toward the lower side than the cover 52. A license plate 61 is fixed to the license plate fixing section 60 by bolts 61a.

Referring to FIGS. 6 to 8, the taillight 51 has a box-like shape extending longer in the transverse direction than in the vertical direction.

The taillight 51 includes a luminous body 63, a housing 64 that supports the luminous body 63, and a lens 65 that is attached to the housing 64 to cover the luminous body 63.

The luminous body 63 is, for example, a light emitting diode (LED).

The housing 64 is provided, at both transverse directional end portions, with bolt-shaped fastening sections 64a projecting to the front side. The pair of fastening sections 64a are inserted in and passed through the left and right arm sections 58a of the taillight fixing section 58 from the rear side.

The taillight 51 is fixed to the taillight fixing section 58 of the lighting device stay 50 by nuts 64b screw engaged with the fastening sections 64a inserted in and passed through the arm sections 58a.

Vibration proof members 64c are interposed between the taillight fixing section 58 and the housing 64.

The lens 65 includes a rear surface section 65a facing to the vehicle rear side, and a peripheral wall section 65b extending forward from a peripheral edge of the rear surface section 65a. The front side of the lens 65 is opened to the inside of the housing 64.

The lens 65 has a rectangular shape elongated in the transverse direction, in rear view. The lens 65 is a luminous section that emits light of the luminous body 63 toward the rear side. The taillight 51 emits light toward the rear side from the rear surface section 65 that serves as a main luminous surface.

The lens 65 is coupled to the housing 64 by engagement of a front end portion of the peripheral wall section 65b with a peripheral edge portion of a rear surface of the housing 64. The lens 65 is formed of, for example, a resin.

Referring to FIGS. 3 to 8, the cover 52 integrally includes a cover main body section 70 in which the taillight 51 is accommodated, and a lower extension section 71 extending rearwardly downward from the cover main body section 70.

The cover main body section 70 includes a cover rear wall section 72 having a rectangular shape elongated in the transverse direction, and a cover peripheral wall section 73 extending forward from a peripheral edge of the cover rear wall section 72. The front side of the cover peripheral wall section 73 is opened to the front side as a whole.

Specifically, the cover peripheral wall section 73 includes a cover upper wall section 74 extending forward from an upper edge of the cover rear wall section 72, a pair of left and right cover side wall sections 75 extending forward from left and right side edges of the cover rear wall section 72, and a cover lower wall section 76 extending forward from a lower edge of the cover rear wall section 72.

The cover upper wall section 74 extends longer to the front side than the cover lower wall section 76.

The cover rear wall section 72 is provided with an opening 77 into which the lens 65 of the taillight 51 is inserted. The opening 77 has a rectangular shape elongated in the transverse direction such as to be along the shape of the lens 65.

The cover main body section 70 is a tubular member opened to the front and rear sides by an open portion on the front side of the cover peripheral wall section 73 and the opening 77 of the cover rear wall section 72. The cover main body section 70 has the cover rear wall section 72 and the cover peripheral wall section 73 integrally formed by resin molding.

The taillight 51 is disposed inside the tubular cover main body section 70. The lens 65 of the taillight 51 is inserted into the opening 77 from inside the cover main body section 70, and projects via the opening 77 to the rear side of the cover 52, to be exposed to outside.

The housing 64 and a front portion of the peripheral wall section 65b of the lens 65 are covered from the periphery by the cover peripheral wall section 73.

The left and right cover side wall sections 75 are provided respectively with tubular turn signal lamp fixing sections 79 projecting to the transverse directionally outer sides.

The lower extension section 71 extends rearwardly downward from the cover lower wall section 76. The license light 54 is attached to a rear surface of the cover lower wall section 76. The license light 54 illuminates the license plate 61 located on a lower side of the license light 54.

The reflector 55 is attached to a rear surface of the cover lower wall section 76 on a lower side of the license light 54.

The cover 52 is fixed to the cover fixing section 59 of the lighting device stay 50 by a pair of cover fixing bolts 80 inserted in and passed through the cover upper wall section 74 from above. The cover fixing bolts 80 are fastened to the nut portions 59a of the cover fixing section 59.

Figure 9:
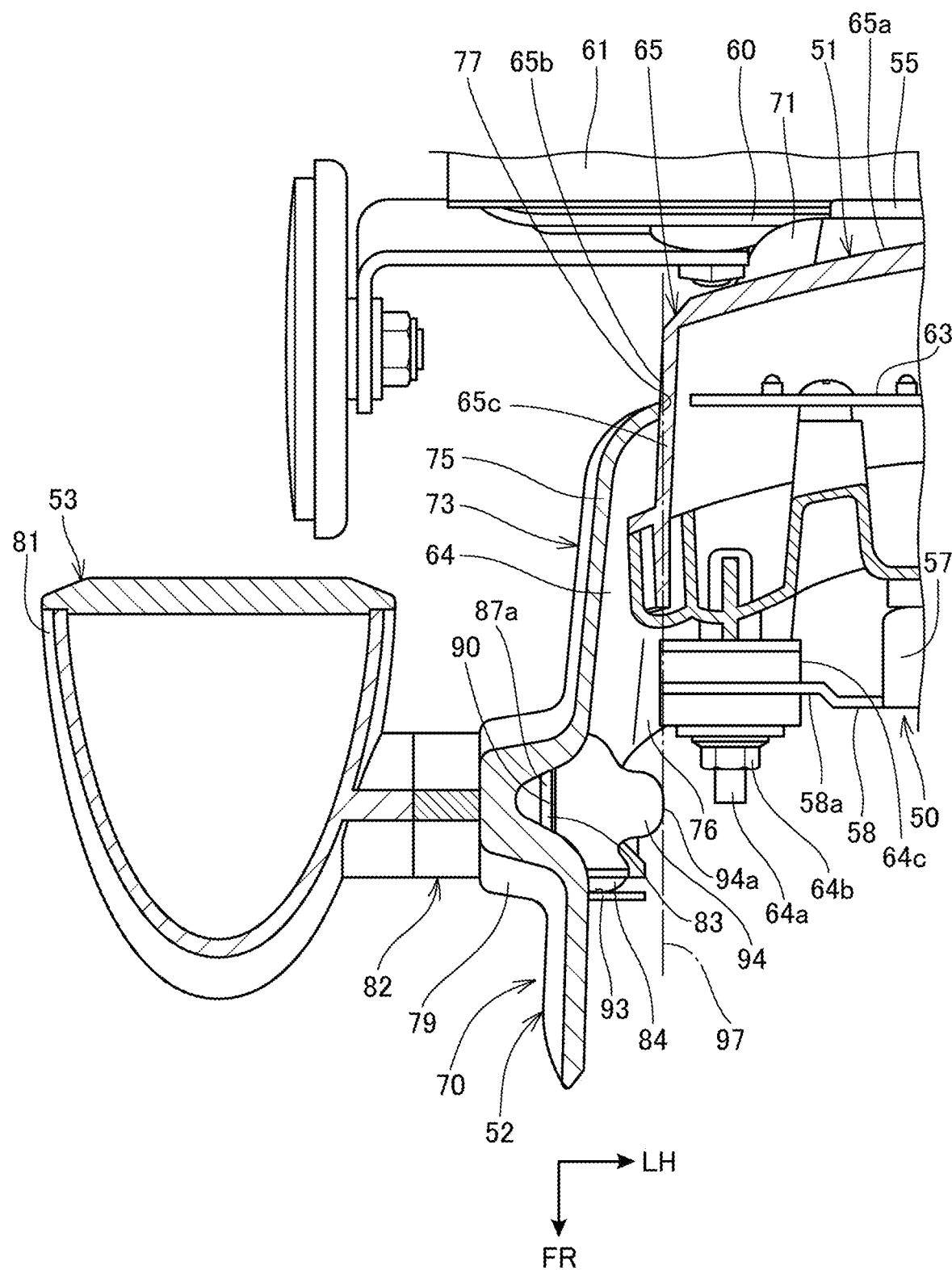
FIG. 9 is a sectional view taken along line IX-IX of FIG. 3.
Figure 10:
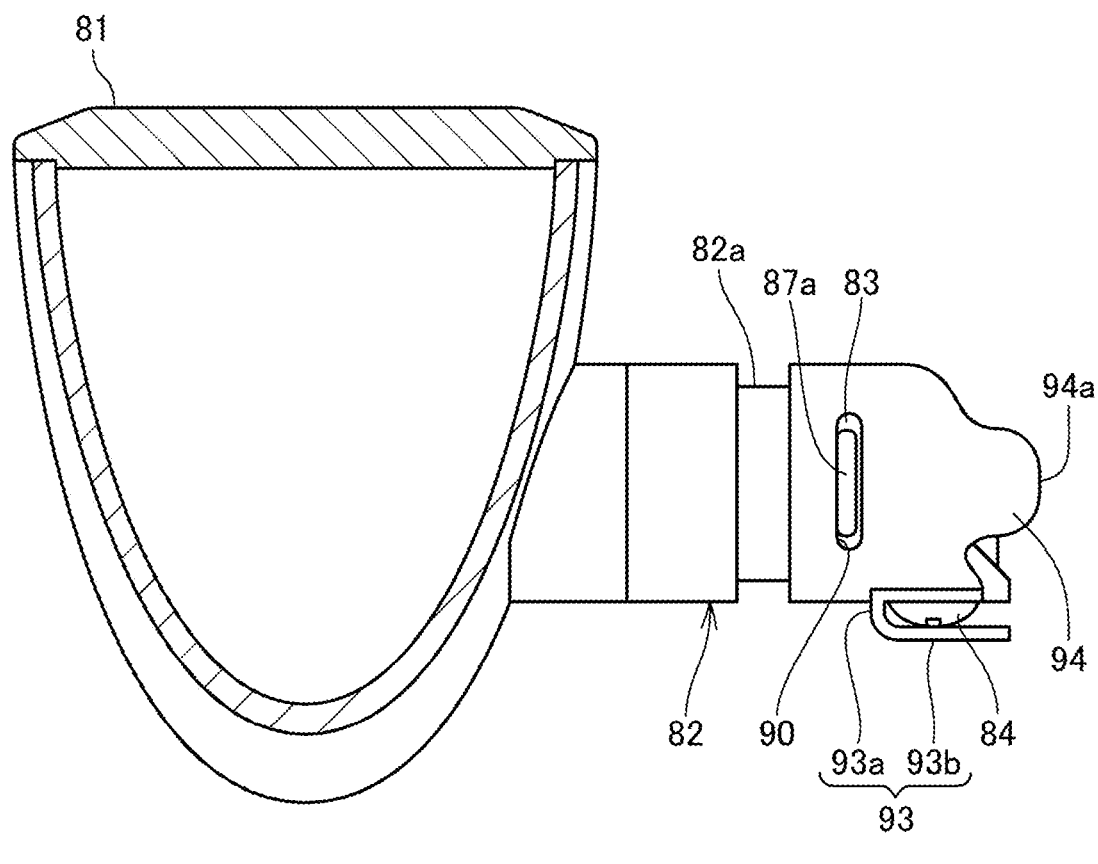
FIG. 10 is a plan view of a rear-side turn signal lamp.
Figure 11:
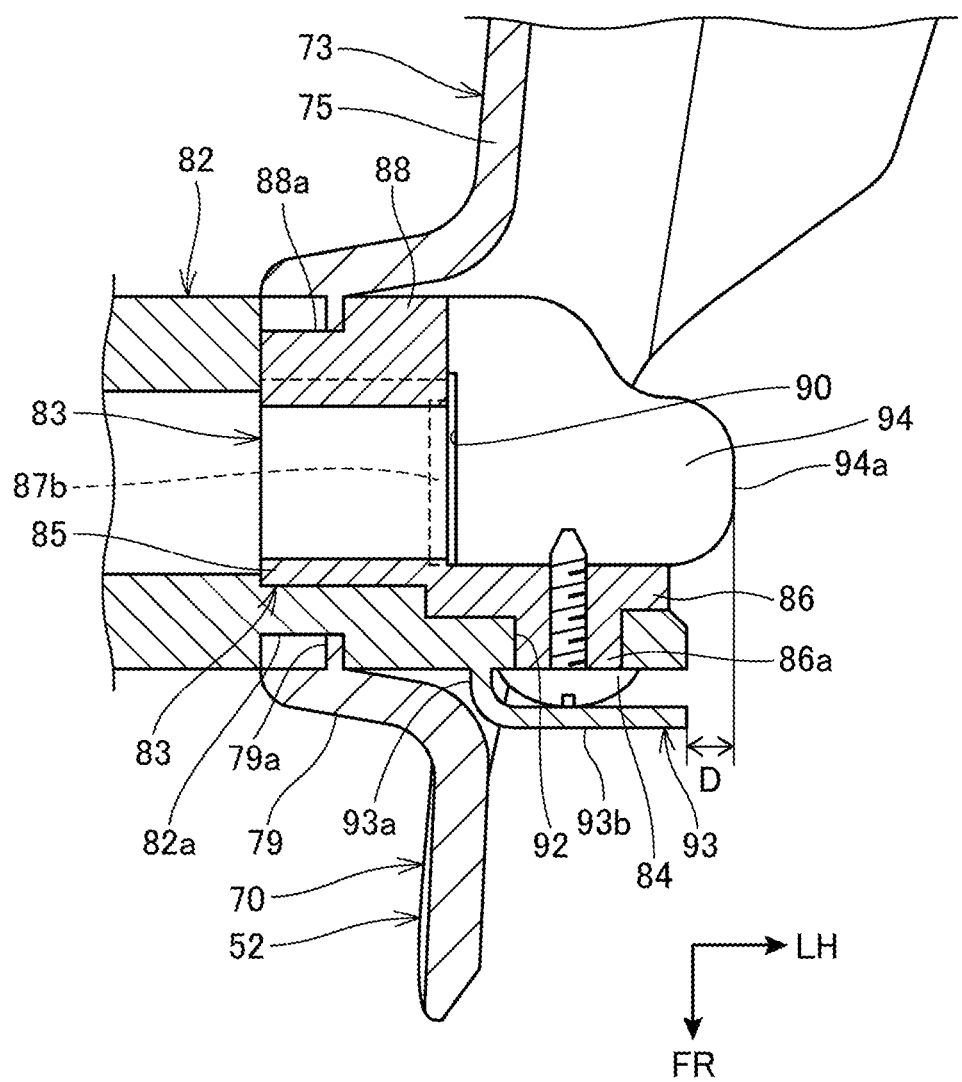
FIG. 11 is a sectional view taken along line XI-XI of FIG. 8.

FIG. 9 is a sectional view taken along line IX-IX of FIG. 3. FIG. 10 is a plan view of the rear-side turn signal lamp 53. FIG. 11 is a sectional view taken along line XI-XI of FIG. 8. Since the rear-side turn signal lamps 53 are provided in left-right symmetry, the rear-side turn signal lamp 53 on the right side will be described in detail here.

Referring to FIGS. 9 to 11, the rear-side turn signal lamp 53 is attached to the turn signal lamp fixing section 79 of the cover side wall section 75, and extends to the transverse directionally outer side from the cover 52.

The rear-side turn signal lamps 53 are provided on both left and right sides in relation to the taillight 51 accommodated inside the cover 52, and are located on the transverse directionally outer sides in relation to the taillight 51.

The rear-side turn signal lamp 53 includes a main body section 81 that emits light rearward, a rubber section 82 that connects the main body section 81 to the cover 52, a core member 83 disposed inside the rubber section 82, and a fixture 84 that fixes the core member 83 to the rubber section 82. Note that a luminous body or the like is disposed inside the main body section 81, but inside structure of the main body section 81 is not illustrated.

Figure 12:
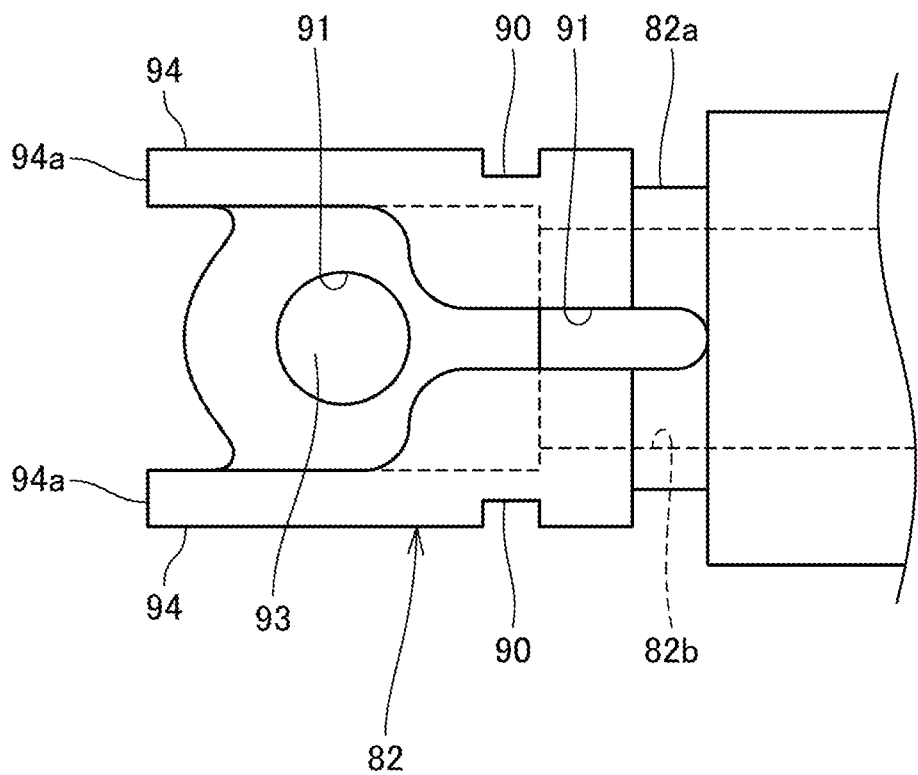
FIG. 12 is a view of a rubber section, as viewed from a rear side.

FIG. 12 is a view of the rubber section 82, as viewed from a rear side.

Referring to FIGS. 9 to 12, the rubber section 82 has a cylindrical shape extending in the transverse direction.

The main body section 81 is connected to a transverse directionally outer end portion of the rubber section 82.

The rubber section 82 has its transverse directionally inner end portion connected to the turn signal lamp fixing section 79 of the cover 52.

The rubber section 82 is entirely configured using an elastomer, and elastically supports the main body section 81 on the cover 52. As a result, the rear-side turn signal lamp 53 can be deformed when receiving an external force, so that external forces can be relieved.

The cover 52 includes an annular projection section 79a projecting to the radial directionally inner side from an inner peripheral section of the tubular turn signal lamp fixing section 79.

The rubber section 82 includes an engaging section 82a for engagement with the projection section 79a. The engaging section 82a is an annular groove provided in an outer periphery of the rubber section 82.

The rear-side turn signal lamp 53 is fixed to the cover 52 by engagement of the engaging section 82a of the rubber section 82 with the projection section 79a of the turn signal lamp fixing section 79.

The core member 83 includes a tubular section 85 fitted to an inner peripheral section 82b of the rubber section 82, and a plate-shaped fixing piece 86 extending in an axial direction of the tubular section 85 from part of an axial directional end surface of the tubular section 85.

The tubular section 85 includes a pair of first projections 87a and 87b projecting to radial directionally outer sides, and a second projection 88 projecting a radial directionally outer side.

The pair of first projections 87a and 87b are disposed to face each other in a radial direction of the tubular section 85. Specifically, the first projection 87a on one side is provided at an upper surface of the tubular section 85, whereas the first projection 87b on the other side is provided at a lower surface of the tubular section 85. The first projections 87a and 87b are in the shape of ribs elongated in a circumferential direction of the tubular section 85.

The second projection 88 is disposed at a position different from those of the first projections 87a and 87b in the circumferential direction of the tubular section 85. Specifically, the second projection 88 is provided at a rear surface of the tubular section 85. The second projection 88 is in the shape of a rib elongated in the axial direction of the tubular section 85. The second projection 88 is provided with a radial directionally recessed stepped portion 88a, at a position for overlapping with the engaging section 82a of the rubber section 82.

The fixing piece 86 is disposed at a position different from those of the first projections 87a and 87b and the second projection 88, in the circumferential direction of the tubular section 85. Specifically, the fixing piece 86 is provided on a front surface side of the tubular section 85.

The fixing piece 86 includes a cylindrical boss section 86a projecting to a radial directionally outer side of the tubular section 85. The boss section 86a projects toward the vehicle front side.

The core member 83 is configured using a material harder than the rubber section 82. The core member 83 is formed of, for example, a resin.

The rubber section 82 includes a pair of hole sections 90 for engagement with the first projections 87a and 87b of the core member 83, a slit 91 for engagement with the second projection 88, and a boss engaging hole 92 for engagement with the boss section 86a.

In addition, the rubber section 82 includes a guard section 93 that covers the boss engaging hole 92 from a radial directionally outer side of the rubber section 82.

The hole sections 90 are provided in an upper surface and a lower surface of the rubber section 82.

The slit 91 is provided in a rear surface of the rubber section 82. The slit 91 extends in an axial direction of the rubber section 82, and an inner end of the slit 91 is opened in the axial direction of the rubber section 82.

The boss engaging hole 92 is provided in a front surface of the rubber section 82.

The hole sections 90, the slit 91, the boss engaging hole 92, and the guard section 93 are located on the transverse directionally inner side relative to the engaging section 82a. An outer end of the slit 91 overlaps with the engaging section 82a.

The guard section 93 includes: a hinge section 93a extending toward a radial directionally outer side from an outer peripheral surface of the rubber section 82; and a plate section 93b extending toward a transverse directionally inner side along an outer peripheral surface of the rubber section 82 from the hinge section 93a toward the taillight 51. The hinge section 93a is a projected portion extending in a circumferential direction of the rubber section 82.

The guard section 93 has a tip of the plate section 93b as a free end, and is openable and closable by rotating with the hinge section 93a as a center. The guard section 93 is formed to be integral with the rubber section 82, and is formed using a highly elastic elastomer, so that it can be easily opened and closed.

In addition, the rubber section 82 includes a pair of inside extension sections 94 extending transverse directionally inward toward the taillight 51 from an upper surface portion and a lower surface portion of the rubber section 82 where the pair of hole sections 90 are formed.

The inside extension sections 94 extend more toward the transverse directionally inner side than a tip of the plate section 93b of the guard section 93 by a distance D.

The inside extension sections 94 are formed to be integral with the rubber section 82, and are formed of an elastomer.

The inside extension sections 94 are located on both sides of the slit 91 such that the slit 91 is interposed therebetween.

In assembling the rear-side turn signal lamp 53, first, of the rear-side turn signal lamp 53, the rubber section 82 is inserted from outside into the turn signal lamp fixing section 79 of the cover 52, and the engaging section 82a is engaged with the projection section 79a of the turn signal lamp fixing section 79.

Next, the core member 83 is inserted into the inner peripheral section 82b of the rubber section 82 from inside of the cover 52.

The tubular section 85 of the core member 83 is inserted into the inner peripheral section 82b to such a position as to overlap with the engaging section 82a from a radial directionally inner side.

The core member 83 is positioned in an axial direction and a radial direction by the engagement of the first projections 87a and 87b with the hole sections 90.

In addition, the core member 83 is positioned in the axial direction and the radial direction by the engagement of the second projection 88 with the slit 91.

Further, the core member 83 is positioned in the axial direction and the radial direction by the engagement of the boss section 86a with the boss engaging hole 92.

The stepped portion 88a of the second projection 88 of the core member 83 makes contact with the projection section 79a of the turn signal lamp fixing section 79 in the radial direction and the axial direction.

Inner end portions of the core member 83 and the rubber section 82 are located inside of the cover 52.

The worker can insert the core member 83 into the rubber section 82 in the manner of pushing open the slit 91 in a radial direction of the rubber section 82, through the pair of inside extension sections 94. Therefore, the core member 83 can be easily assembled onto the rubber section 82.

Since the core member 83 is located on the radial directionally inner side of the engaging section 82a and the projection section 79a, rigidity of the engaging section 82a can be increased by the core member 83. Therefore, the rubber section 82 can be firmly fixed to the cover 52, while elastically supporting the main body section 81 by the rubber section 82.

After the core member 83 is inserted into the rubber section 82, the fixture 84 is fastened to the boss section 86a. The fixture 84 is a screw, and is fastened to the boss section 86a from a radial directionally outer side of the rubber section 82. The fixture 84 is made of metal, for example.

A screw head portion 84a of the fixture 84 makes contact with a peripheral edge portion of the boss engaging hole 92 of the rubber section 82, and fixes the rubber section 82 and the core member 83.

The worker opens the guard section 93 in the manner of turning it to expose the boss section 86a, and fastens the fixture 84 to the boss section 86a from the front side.

After the fixture 84 is fastened, the guard section 93 closes by elasticity, to cover the screw head portion 84a from a front outer side. Specifically, the fixture 84 is covered with the elastomer-made guard section 93, and is not exposed to outside.

Here, an example of an assembling procedure of the rear lighting unit 37 will be described.

Referring to FIG. 7, first, a first sub-assembly 95 (sub-assembly) in which the rear-side turn signal lamps 53, the license light 54 and the reflector 55 are assembled onto the cover 52 and a second sub-assembly 96 in which the taillight 51 is assembled onto the lighting device stay 50 are prepared.

Next, the taillight 51 of the second sub-assembly 96 is inserted into the cover main body section 70 of the first sub-assembly 95 from the front side, as indicated by arrow A in FIG. 7. The taillight 51 has the lens 65 inserted into the opening 77, and the rear surface section 65a of the lens 65 is exposed to the rear side of the opening 77.

Specifically, the lens 65 of the taillight 51 and the rear-side turn signal lamps 53 are disposed at substantially the same height in the vehicle height direction. Therefore, when the second sub-assembly 96 is moved in the direction of arrow A, a side surface 65c of the peripheral wall section 65b of the lens 65 passes on the inner side of the rubber section 82 and the fixture 84.

In the present embodiment, the fixture 84 of the first sub-assembly 95 is covered by the guard section 93 of the rubber section 82. As a result, when the second sub-assembly 96 is assembled onto the first sub-assembly 95, the fixture 84 is prevented from making direct contact with the side surface 65c and the rear surface section 65a of the lens 65. Therefore, the lens 65 can be prevented from being damaged by the fixture 84.

In addition, since the lens 65 can be prevented from being damaged by the fixture 84, the clearance between the lens 65 and the cover 52 can be set small. Therefore, the lens 65 can be enlarged in the transverse direction, and the cover 52 can be made small in the transverse direction, so that design property of the rear lighting unit 37 can be enhanced.

Referring to FIGS. 7 and 9, an end portion 94a on the transverse directionally inner side of the inside extension section 94 is located on an extension line 97 formed by extending the side surface 65c of the lens 65 toward the front side. Therefore, when the second sub-assembly 96 is moved in the direction of arrow A, the second sub-assembly 96 can be guided by the inside extension section 94 in such a manner that the side surface 65c of the lens 65 is moved along the end portion 94a of the inside extension section 94. Therefore, the second sub-assembly 96 can be easily assembled onto the first sub-assembly 95. Here, the end portion 94a may overlap with the extension line 97, or may be slightly spaced from the extension line 97, insofar as the second sub-assembly 96 can be guided by the inside extension section 94. In other words, the end portion 94a need only be located substantially on the extension line 97.

In addition, the end portion 94a of the inside extension section 94 extends more toward the side surface 65c side of the lens 65 than the fixture 84 and the guard section 93 in the transverse direction. Therefore, the inside extension section 94 is liable to come into contact with the side surface 65c of the lens 65 earlier than the fixture 84 and the guard section 93. Accordingly, the guard section 93 covering the fixture 84 can be prevented from strongly colliding on the side surface 65c of the lens 65.

After the first sub-assembly 95 is inserted into the second sub-assembly 96, the first sub-assembly 95 and the second sub-assembly 96 are fixed by the cover fixing bolts 80.

In a state in which assemblage of the rear lighting unit 37 is completed, the rear-side turn signal lamp 53 inclusive of the fixture 84 is located on the front side relative to the taillight 51, as depicted in FIG. 9.

Referring to FIG. 5, the rear lighting unit 37 is fixed to the rear fender 36 at three points by the pair of bolt sections 57a and the bolt 57d provided in the lighting device stay 50.

The lighting device stay 50 supports the license plate 61 by the license plate fixing section 60, and, therefore, it is also a license plate stay.

The pair of bolt sections 57a and the bolt 57d are fastened to the rear fender 36 at positions between the taillight 51 and the license plate 61 in the vertical direction. As a result, the lighting device stay 50 supports the taillight 51 and the license plate 61 respectively on the upper side and the lower side of the pair of bolt sections 57a and the bolt 57d, and, therefore, the lighting device stay 50 is fixed to the rear fender 36 in a state of good weight balance. Consequently, vibration of the rear lighting unit 37 can be reduced.

As depicted in FIG. 3, the rear fender 36, the cover 52 and the lens 65 are disposed in the center of the vehicle width, similarly to the rear wheel 3.

The cover 52 is smaller than the rear fender 36 in transverse directional size. In addition, the lens 65 is smaller than the cover 52 and greater than the reflector 55, in transverse directional size.

As has been described above, according to the embodiment of the present invention, the lamp body structure for the motorcycle 1 includes the taillight 51 and the cover 52 covering the taillight 51 from the periphery; the cover 52 include the pair of rear-side turn signal lamps 53 fixed to the cover 52 such as to be located on both left and right sides of the taillight 51; the rear-side turn signal lamp 53 is provided with the fixture 84 for fixing the rear-side turn signal lamp 53 to the cover 52; the taillight 51 is inserted into the opening 77 provided in the cover 52, whereby the lens 65 is exposed to the outside and is covered by the cover 52 from the periphery, and the rear-side turn signal lamp 53 includes the guard section 93 that covers the fixture 84.

According to this configuration, the fixture 84 for fixing the rear-side turn signal lamp 53 to the cover 52 is covered by the guard section 93 with which the rear-side turn signal lamp 53 is provided. Therefore, when the taillight 51 is inserted into the opening 77 of the cover 52 covering the taillight 51 from the periphery, the fixture 84 can be prevented by the guard section 93 from making contact with the taillight 51. Accordingly, with the taillight 51 covered by the cover 52, design property can be enhanced, and assemblability can be enhanced.

In addition, the rear-side turn signal lamp 53 includes the main body section 81 that emits light, and the rubber section 82 that elastically supports the main body section 81 on the cover 52, and the guard section 93 is provided in the rubber section 82.

According to this configuration, since the guard section 93 is provided as part of the rubber section 82, the guard section 93 makes a soft contact when making contact with the rear-side turn signal lamp 53. Therefore, damaging of the taillight 51 can be effectively prevented.

Besides, the rubber section 82 includes the engaging section 82a for engagement with the cover 52, the rear-side turn signal lamp 53 includes the core member 83 disposed inside the rubber section 82 at the engaging section 82a, and the fixture 84 fixes the rubber section 82 and the core member 83.

According to this configuration, the core member 83 is provided inside the engaging section 82a where the rubber section 82 is engaged with the cover 52; therefore, the rubber section 82 can be firmly fixed to the cover 52, while securing a configuration in which the rear-side turn signal lamp 53 is elastically supported by the rubber section 82. In addition, the fixture 84 fixing the rubber section 82 and the core member 83 is covered by the guard section 93, and damaging of the taillight 51 can be prevented.

Further, the fixture 84 is a screw. According to this configuration, while the screw is hard and is liable to damage the taillight 51, the taillight 51 is covered by the guard section 93. Therefore, damaging of the taillight 51 is effectively prevented.

Besides, the rubber section 82 includes the inside extension section 94 extending more toward the taillight 51 side than the guard section 93.

According to this configuration, the inside extension section 94 is liable to make contact with the taillight 51 earlier than the guard section 93, and, therefore, the guard section 93 is restrained from strongly coming into contact with the taillight 51. Consequently, damaging of the taillight 51 is effectively prevented.

In addition, the end portion 94a of the inside extension section 94 is located substantially on the extension line 97 of the side surface 65c of the taillight 51.

According to this configuration, when the taillight 51 is inserted into the opening 77 of the cover 52, the insertion of the taillight 51 can be guided by the end portion 94a of the inside extension section 94. Therefore, the taillight 51 can be easily assembled onto the cover 52.

Besides, the rear fender 36 covering the rear wheel 3 and the reflector 55 reflecting light are provided, the cover 52 is smaller than the rear fender 36 in transverse directional size, and the lens 65 of the taillight 51 is greater than the reflector 55 in transverse directional size.

According to this configuration, in the case where the cover 52 is smaller than the rear fender 36 in transverse directional size and the lens 65 of the taillight 51 is greater than the reflector 55 in transverse directional size, the clearance between the taillight 51 and the fixture 84 is reduced and, therefore, the taillight 51 is liable to be damaged, but damaging of the taillight 51 can be effectively prevented by the guard section 93.

In addition, the guard section 93 has a plate-like shape connected to the rubber section 82 through the hinge section 93a at one end, and is openable and closable with the hinge section 93a as a center by elasticity of the rubber section 82.

According to this configuration, with the guard section 93 opened and closed with the hinge section 93a as a center by elasticity of the rubber section 82, easy access to the fixture 84 is secured, and assemblability is good.

Besides, the rubber section 82 includes the inside extension section 94 extending more toward the taillight 51 side than the guard section 93; the core member 83 includes the first projections 87a and 87b projecting in the radial direction; the rubber section 82 is tubular and is provided with the hole sections 90 for engagement with the first projections 87a and 87b of the core member 83 inserted in the inside of the rubber section 82; and the inside extension section 94 extends toward the taillight 51 side from the part where the hole sections 90 are provided.

According to this configuration, the core member 83 can be inserted into the inside of the rubber section 82 in the manner of pushing open the rubber section 82 through the inside extension section 94, so that assemblability is good.

Further, the taillight 51 is inserted into the opening 77 of the first sub-assembly 95 formed by assembling the rear-side turn signal lamps 53 onto the cover 52.

According to this configuration, since the taillight 51 can be assembled onto the first sub-assembly 95 formed by assembling the rear-side turn signal lamps 53 onto the cover 52, it is possible, for example, to simplify the assembling step on the production line.

In addition, the lamp body is the taillight 51, and the rear-side turn signal lamps 53 are provided at rear portions of the vehicle.

According to this configuration, by covering the taillight 51 with the cover 52, design property of the taillight 51 can be enhanced. In addition, when the taillight 51 is inserted into the cover 52, the taillight 51 can be prevented from being damaged by the fixtures 84 of the rear-side turn signal lamps 53.

Note that the above-described embodiment depicts a mode of the present invention, and the present invention is not limited to the above embodiment.

While the taillight 51, the cover 52 and the rear-side turn signal lamps 53 which are provided at rear portions of the vehicle body have been taken as an example in describing the above embodiment, this is not limitative of the present invention.

For instance, in a lamp body structure for a saddle riding vehicle, including a headlight (lamp body) provided in a front portion of the vehicle body and a front cover (cover) covering the headlight from the periphery, the front cover may include a pair of turn signal lamps fixed to the front cover such as to be located on both left and right sides of the headlight, the turn signal lamp may be provided with a fixture for fixing the turn signal lamp to the front cover, the headlight may be inserted into an opening provided in the front cover, whereby a luminous section is exposed to the outside and is covered by the front cover from the periphery, and the turn signal lamp may include a guard section covering the fixture.

In addition, while the fixture 84 has been described as being a screw in the above embodiment, this is not restrictive of the present invention. The fixture may be, for example, a clip for engagement with a hole in the boss section 86a. Besides, the fixture may be, for example, a claw-shaped fixing body that extends in a radial direction of the boss section 86a of the core member 83 from a tip portion of the boss section 86a and presses a peripheral edge portion of the boss engaging hole 92 of the rubber section 82. This fixing body is formed to be integral with the core member 83.

In addition, while description has been made by taking the motorcycle 1 as an example in the above embodiment, this is not limitative of the present invention. The present invention is applicable to three-wheeled saddle riding vehicles having two front wheels or two rear wheels, and is applicable to saddle riding vehicles having four or more wheels.

DESCRIPTION OF REFERENCE SYMBOLS

1 Motorcycle (Saddle riding vehicle)
3 Rear wheel (Wheel)
36 Rear fender (Fender)
51 Taillight (Lamp body)
52 Cover
53 Rear-side turn signal lamp (Turn signal lamp)
55 Reflector
65 Lens (Luminous section)
65c Side surface
77 Opening
81 Main body section
82 Rubber section
82a Engaging section
83 Core member
84 Fixture
87a, 87b First projection (Projection)
90 Hole section
93 Guard section
93a Hinge section
94 Inside extension section
94a End portion
95 First sub-assembly (Sub-assembly)
97 Extension line

The invention claimed is:

1. A lamp body structure for a saddle riding vehicle, comprising:
   a lamp body; and
   a cover covering the lamp body from a periphery,
   wherein the cover includes a pair of turn signal lamps fixed to the cover such as to be located on both left and right sides of the lamp body, the turn signal lamp being provided with a fixture for fixing the turn signal lamp to the cover,
   the lamp body is inserted in an opening formed in the cover, whereby a luminous section is exposed to outside and is covered by the cover from a periphery, and
   the turn signal lamp includes a guard section covering the fixture,
   the turn signal lamp includes a main body section that emits light, and a rubber section that is inserted from left outside and right outside into the cover,
   inside the cover, the fixture is inserted into the rubber section in a radial direction of the rubber section,
   the guard section is provided in an outer periphery of the rubber section, and the guard section covers the fixture from a radial directionally outer side of the rubber section.

2. The lamp body structure for the saddle riding vehicle according to claim 1,
   wherein the rubber section includes an engaging section for engagement with the cover,
   the turn signal lamp includes a core member disposed inside the rubber section at the engaging section, and
   the fixture fixes the rubber section and the core member.

3. The lamp body structure for the saddle riding vehicle according to claim 2, wherein the fixture is any one of a screw, a clip, and a fixing body formed to be integral with the core member.

4. The lamp body structure for the saddle riding vehicle according to claim 1, wherein the rubber section includes an inside extension section extending more toward the lamp body side than the guard section.

5. The lamp body structure for the saddle riding vehicle according to claim 4, wherein an end portion of the inside extension section is located substantially on an extension line of a side surface of the lamp body.

6. The lamp body structure for the saddle riding vehicle according to claim 1,
   wherein a fender that covers a wheel and a reflector that reflects light are provided, and
   the cover is smaller than the fender in transverse directional size, and the luminous section of the lamp body is greater than the reflector in transverse directional size.

7. The lamp body structure for the saddle riding vehicle according to claim 1, wherein the guard section has a plate-like shape connected to the rubber section through a hinge section at one end, and is openable and closable with the hinge section as a center by elasticity of the rubber section.

8. The lamp body structure for the saddle riding vehicle according to claim 2,
   wherein the rubber section includes an inside extension section extending more toward the lamp body side than the guard section,
   the core member includes projections projecting in a radial direction,
   the rubber section is tubular, and includes a hole section for engagement with the projection of the core member inserted into inside of the rubber section, and the inside extension section extends to the lamp body side from a part where the hole section is provided.

9. The lamp body structure for the saddle riding vehicle according to claim 1, wherein the lamp body is inserted into the opening of a sub-assembly formed by assembling the turn signal lamps onto the cover.

10. The lamp body structure for the saddle riding vehicle according to claim 1, wherein the lamp body is a taillight, and the turn signal lamps are provided at rear portions of the vehicle.

* * * * *